June 5, 1962  G. E. BELL ET AL  3,037,391
WINDSHIELD WIPER MECHANISM
Filed Dec. 23, 1959  4 Sheets-Sheet 1

INVENTORS
GREGORY E. BELL
DAVID D. CAMPBELL
ROBERT M. FOX
BY W. E. Finken
THEIR ATTORNEY

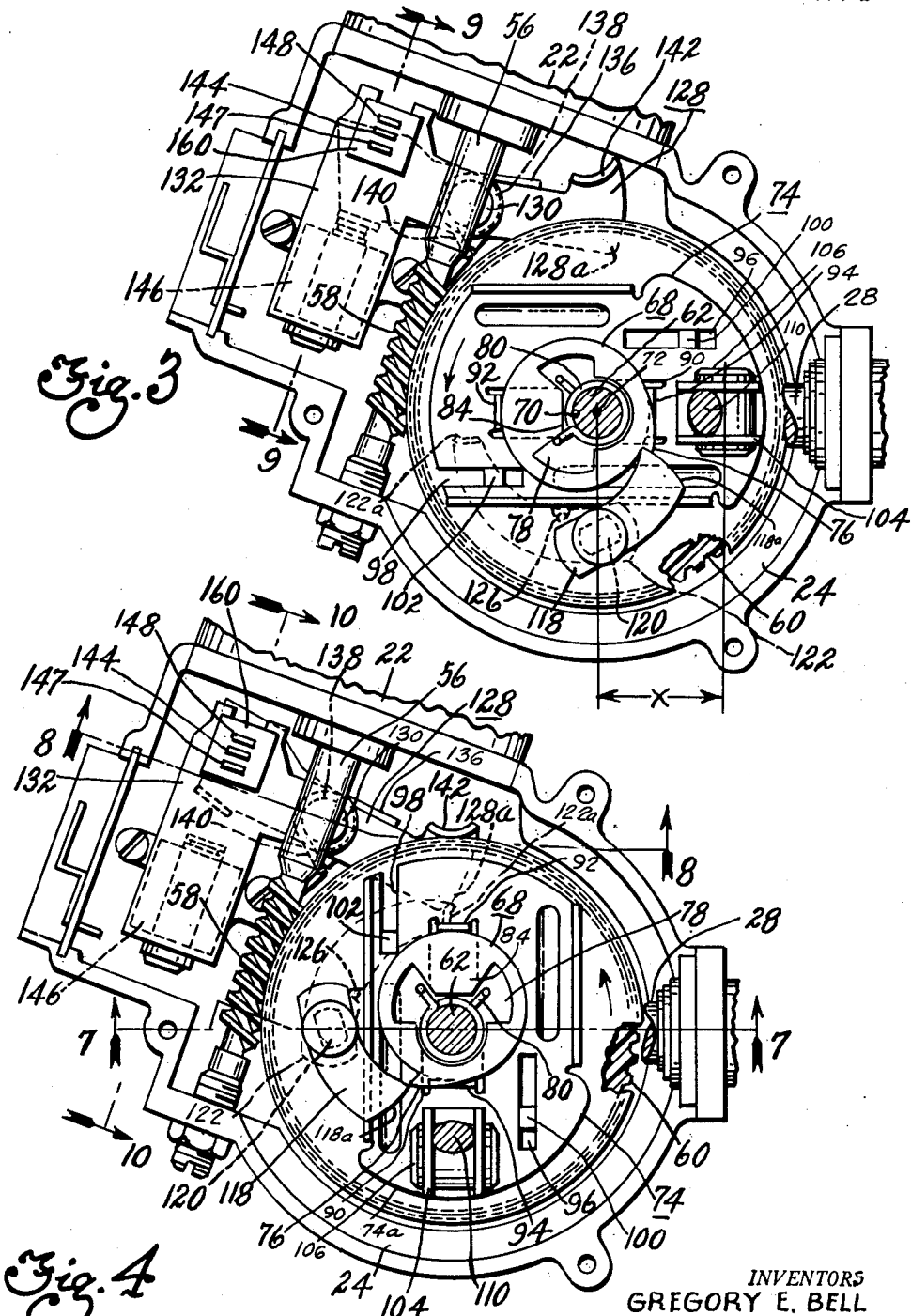

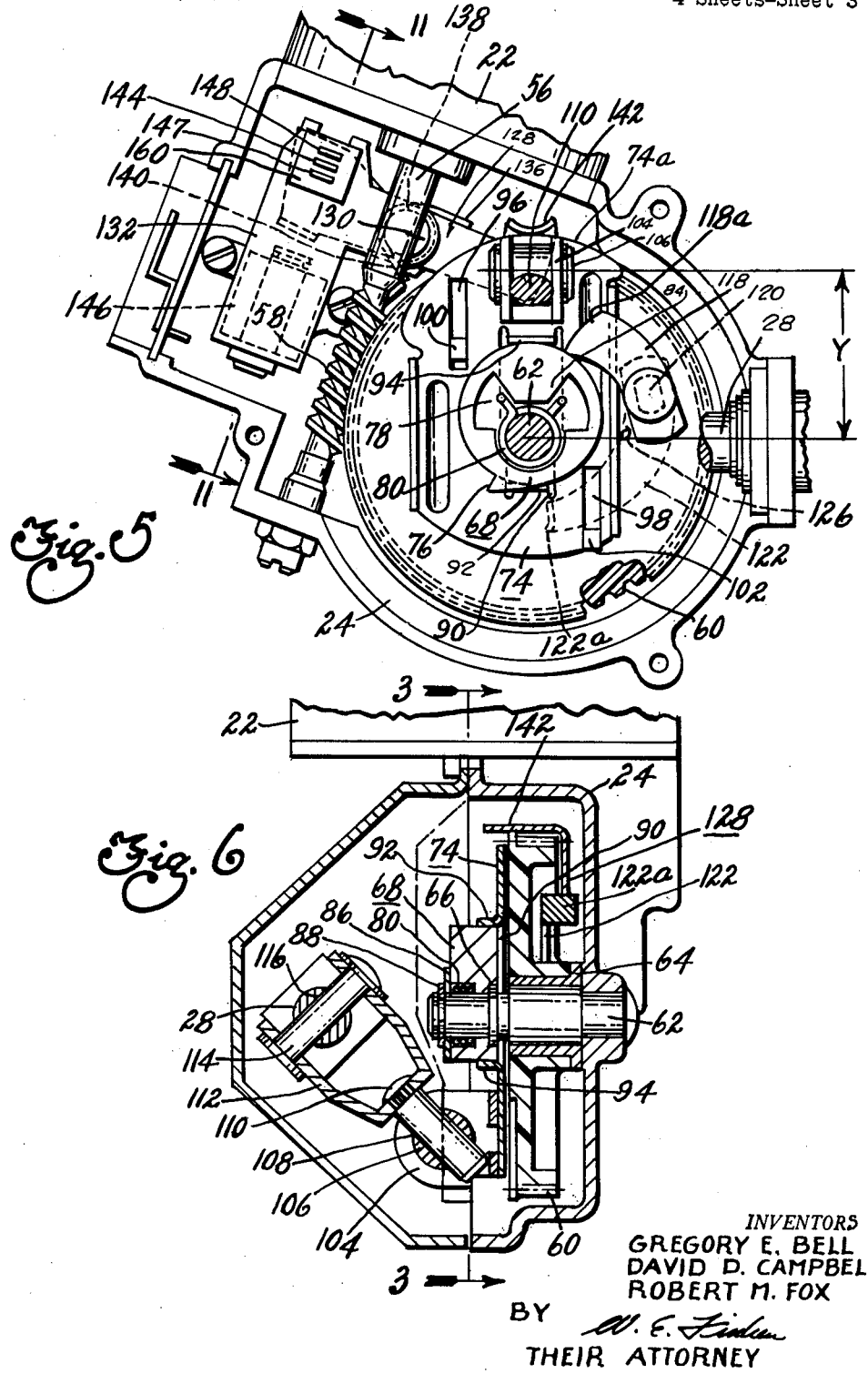

June 5, 1962  G. E. BELL ET AL  3,037,391
WINDSHIELD WIPER MECHANISM
Filed Dec. 23, 1959  4 Sheets-Sheet 4
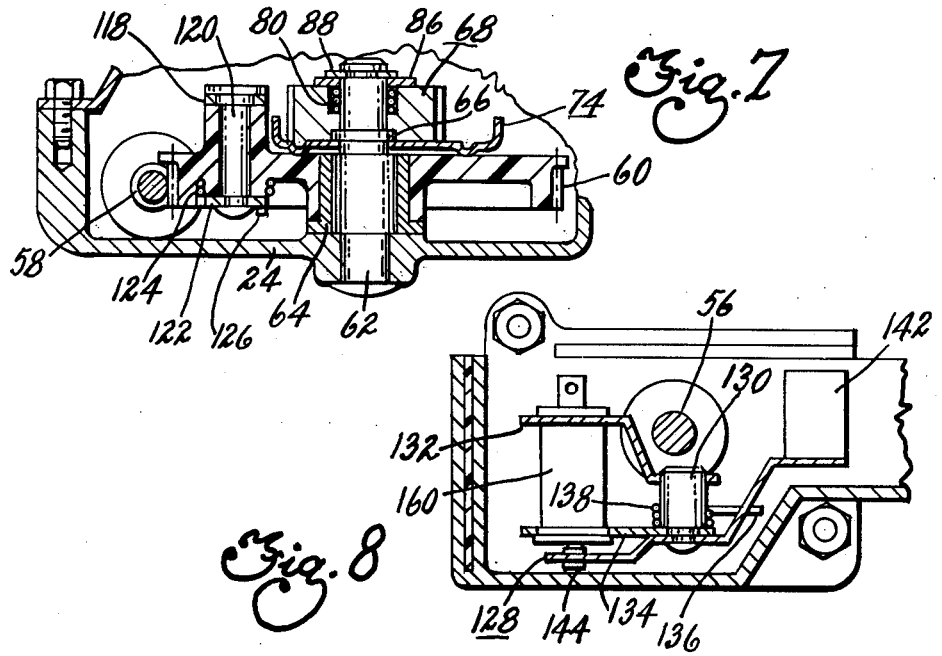
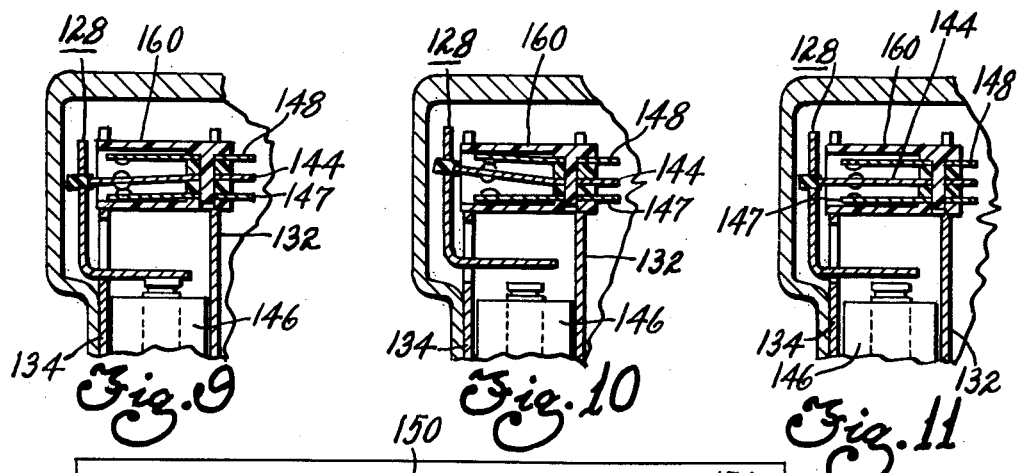
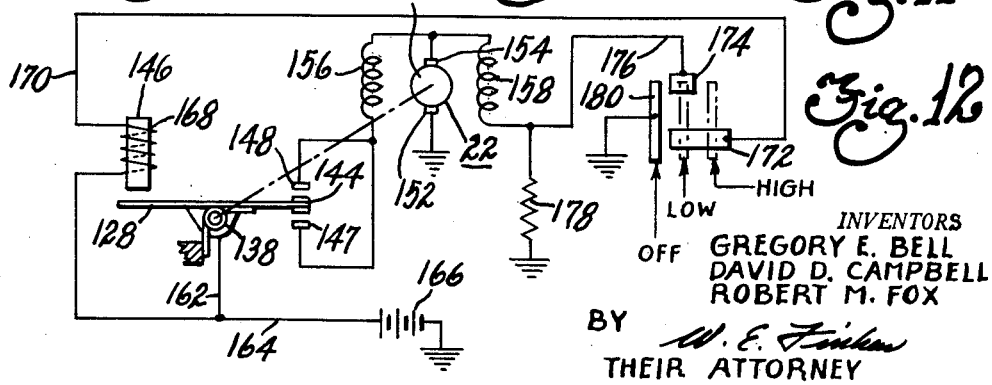
INVENTORS
GREGORY E. BELL
DAVID D. CAMPBELL
ROBERT M. FOX
BY
W. E. Finken
THEIR ATTORNEY

United States Patent Office 3,037,391
Patented June 5, 1962

3,037,391
WINDSHIELD WIPER MECHANISM
Gregory E. Bell, Roseville, David D. Campbell, Birmingham, and Robert M. Fox, Detroit, Mich., assignors to General Motors Corporation, Detroit, Mich., a corporation of Delaware
Filed Dec. 23, 1959, Ser. No. 861,621
16 Claims. (Cl. 74—70)

This invention pertains to the art of windshield cleaning, and particularly to mechanism for actuating windshield wipers from a rotary power source through a normal oscillatory wiping stroke and to a depressed parked position.

At the present tme the majority of electric motor driven windshield wipers are actuated directly from the rotary output shaft through reciprocating connecting links, the outer ends of which are connected to crank arms for converting the back and forth movement of the connecting links into oscillation of the pivot shafts. In installations where the electric motor rotates only a single crank, in order to obtain asymmetrical oscillation of a pair of wipers, it is necessary to either embody a reversing linkage in the drive to one of the pivot shafts, or position one of the connecting links above its pivot shaft and the other connecting link below its pivot shaft. The present invention relates to an electric motor driven actuating mechanism wherein motor rotation is converted to oscillation of the output shaft of the mechanism whereby a double crank can be employed to actuate the connecting links, and both connecting links can be located beneath their respective pivot shafts. In addition, the actuating mechanism embodies means for varying the amplitude of the stroke imparted to the oscillatory output shaft so as to obtain depressed parking of the wipers outside of their normal running strokes.

Accordingly, among our objects are the provision of windshield wiper actuating mechanism driven by a rotary power source including a variable throw crank assembly; the further provision of windshield wiper actuating mechanism including means for converting rotary motion to variable amplitude oscillatory motion of an output shaft; the further provision of an electric motor driven wiper unit having a rotary crank and eccentric means for varying the throw of the crank; and the still further provision of electric motor driven wiper actuating mechanism including an electromagnetic control means and actuating means operated by the crank for deenergizing the motor when the throw of the crank is a maximum.

The aforementioned and other objects are accomplished in the present invention by embodying eccentric means for shifting a crank plate which is connected to rotate with the driving member although free to move radially relative thereto. Specifically, the actuating mechanism includes a unidirectional electric motor having a worm which meshes with a worm gear. The worm gear is journalled for rotation on a fixed shaft having an eccentric journalled thereon. The eccentric carries a torsion spring brake which, in its engaged position, restrains rotation of the eccentric relative to the shaft.

A crank plate is journalled for rotation on the external periphery of the eccentric, the crank plate being drivingly connected to the worm gear by means of a pair of lugs on the worm gear which extend through elongated slots in the plate. The elongated slots in the plate permit radial movement of the plate relative to the worm gear. The crank plate carries a crank pin, the axis of which is located in a plane normal to the axis of the stationary worm gear shaft and has a diametrical circular opening therethrough. The oscillatory output shaft of the mechanism has its axis in alignment with the axis of the stationary worm gear shaft although located at right angles thereto. The oscillatory output shaft and the crank pin are interconnected by a yoke having a pin extending through a diametrically extending circular opening in the output shaft, the yoke being carried by a drive pin which extends through the circular opening in the crank pin. During rotation of the crank plate, the output shaft will be oscillated throughout a stroke of predetermined amplitude through the yoke as determined by the throw of the crank pin carried by the crank plate. The oscillatory output shaft has a double ended crank arm attached thereto, to which the inner ends of connecting links of pivot shafts are attached, the outer end of the connecting link being pivotally connected to spaced crank arms which are drivingly connected to spaced pivot shafts.

The worm gear has a drive pawl pivotally attached thereto which is spring biased to normally engage an abutment on the eccentric for releasing the torsion spring brake so that during normal running operation of the actuating mechanism the eccentric rotates with the worm gear, and consequently the throw of the crank remains fixed. When it is desired to park the wiper mechanism, the drive pawl is disengaged from the abutment on the eccentric whereupon the torsion spring brake will engage the shaft to restrain further rotation of the eccentric. During continued rotation of the worm gear and the crank plate, the crank plate moves radially relative to the fixed shaft thereby increasing the throw of the crank, and consequently increasing the amplitude of oscillation imparted to the output shaft adjacent the inboard stroke end of the wipers.

The control means for the actuating mechanism includes a relay for actuating a pivotally mounted armature which is spring biased in one direction. The armature is connected to a movable switch contact disposed between a pair of stationary contacts. When the relay is energized, the armature is withdrawn from the orbit of a control lever for the drive pawl and maintains the movable switch contact in engagement with the running stationary contact. Energization of the relay is controlled by a manual switch, and when the relay is deenergized, the torsion spring moves the armature so that the movable contact engages the stationary parking contact, thereby continuing energization of the motor. At the same time, the armature is moved into the orbital path of the control lever for the drive pawl, and at a predetermined position of the worm gear, the armature trips the control lever and thus disengages the drive pawl from the abutment on the eccentric. During continued rotation of the worm gear and crank plate throughout 180°, the throw of the crank is increased to a maximum and when the throw of the crank is a maximum the crank plate engages the armature and actuates the armature to disengage the movable switch contact from the parking switch contact thereby deenergizing the motor. The motor coasts to a standstill and the wipers remain in the depressed parked position.

Further objects and advantages of the present invention will be apparent from the following description, reference being had to the accompanying drawings, wherein a preferred embodiment of the present invention is clearly shown.

In the drawings:
FIGURE 1 is a fragmentary view, partly in section and partly in elevation, of a vehicle equipped with the windshield wiper actuating mechanism of this invention.
FIGURE 2 is a front plan view of the actuating mechanism, rotated 90° from its position in FIGURE 1.
FIGURE 3 is a sectional view of the actuating mechanism taken along line 3—3 of FIGURE 6 with the mechanism in the running position.
FIGURE 4 is a view similar to FIGURE 3 of the actuating mechanism going into the park position.

FIGURE 5 is a view similar to FIGURE 3 of the mechanism in the park position.

FIGURE 6 is an enlarged sectional view taken along line 6—6 of FIGURE 2.

FIGURE 7 is a fragmentary sectional view taken along line 7—7 of FIGURE 4.

FIGURE 8 is a fragmentary sectional view taken along line 8—8 of FIGURE 4.

FIGURES 9, 10 and 11 are, respectively, fragmentary sectional views taken along lines 9—9, 10—10 and 11—11 of FIGURES 3, 4 and 5.

FIGURE 12 is an electrical schematic depicting the circuits for controlling the wiper motor.

Figure 1:
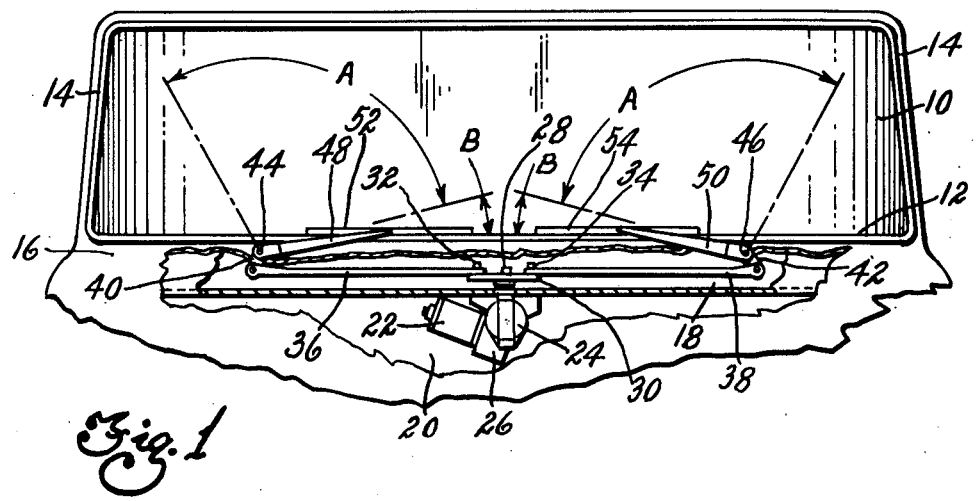
Figure 2:
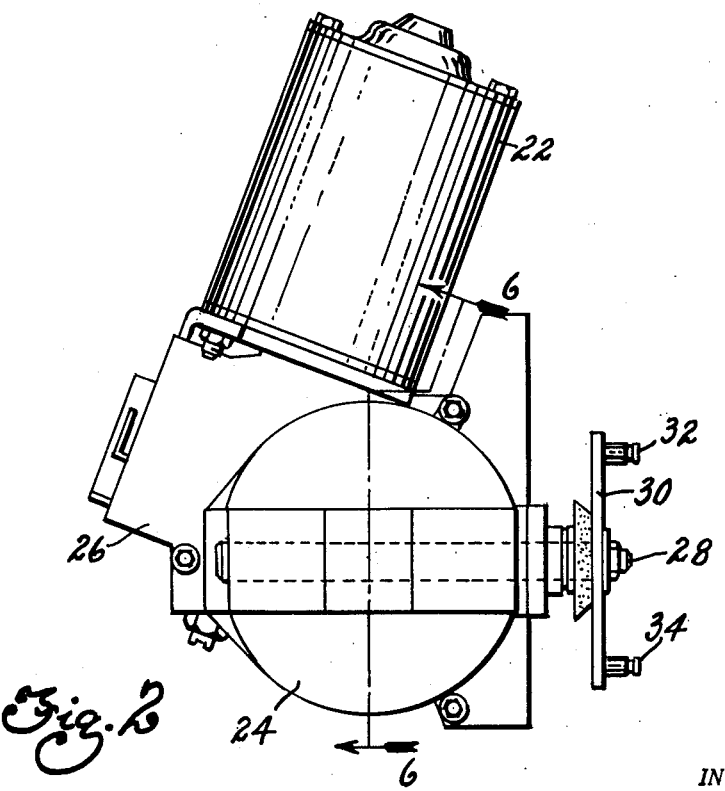

With particular reference to FIGURE 1, a portion of a vehicle is shown including a windshield 10 having a lower reveal molding 12 and side pillars 14. The vehicle includes a cowl 16 having a plenum chamber 18 disposed therebeneath and a firewall 20 to the rear thereof. The windshield wiper actuating mechanism includes a motor 22, a gear box 24 and control mechanism 26 disposed in the engine compartment and suitably attached to the firewall 20 of the vehicle. The output shaft, or driven member, 28 of the mechanism 22, 24 and 26 is arranged vertically and extends into the plenum chamber 18, the output shaft having a double ended crank arm 30 attached thereto. The output shaft 28 has oscillation imparted thereto and the crank arm 30 carries spaced crank pins 32 and 34 to which the inner ends of connecting links 36 and 38 are pivotally attached. The outer ends of the connecting links 36 and 38 are pivotally attached to crank arms 40 and 42, respectively. The crank arms 40 and 42 are drivingly connected to spaced pivot shafts 44 and 46, respectively, to which wiper arms 48 and 50 are drivingly connected. The arms 48 and 50 carry wiper blades 52 and 54 which are oscillatable over asymmetrical paths across the outer surface of the windshield 10 throughout a running stroke A of substantially 110°. The blades 52 and 54 can be moved beyond the inboard end of the running stroke through an angle B, of approximately 15°, against the lower reveal molding 12, this position constituting the depressed parked position of the wiper blades 52 and 54. With reference to FIGURES 2 and 3, the electric motor 22 is of the unidirectional type and includes an armature shaft 56 having an integral worm gear 58.

The worm 58 meshes with a worm gear, or driving member, 60 which, as seen in FIGURE 6, is journalled for rotation about a fixed shaft 62 by sleeve bearing 64. The shaft 62 is formed with a shoulder 66 spaced from the face of the worm gear 60, and an eccentric 68 is journalled on the reduced diameter portion of the shaft 62 as seen in FIGURES 6 and 7. The center of the eccentric 68 is indicated by numeral 70 in FIGURE 3, from which it can be seen that the center 70 of the eccentric is spaced from the axis 72 of the shaft 62. The eccentric 68 has a cylindrical periphery about which a crank plate, or driven element, 74 is journalled. In addition, the eccentric 68 is formed with a peripheral abutment 76 axially spaced from the cylindrical surface on which the crank plate 74 is journalled. The eccentric 68 is also formed with a recess 78 which receives a torsion spring brake comprising a plurality of closely wound helical convolutions that engage the stationary shaft 62. The ends of the torsion spring brake 80 are engageable with opposite surfaces of a lug 84 projecting into the recess 78. When the ends of the torsion spring brake are disengaged from the lug 84, the clutch is engaged thereby precluding relative rotary movement between the eccentric 68 and the shaft 62. On the other hand, when the lug 84 is driven against either of the ends of the torsion spring brake, as shown in FIGURE 3, the brake is released whereupon the eccentric 68 is free to rotate relative to the shaft 62. As seen in FIGURE 6, the torsion spring brake 80 is retained in the recess 78 by a washer 86 and a snap ring 88.

The crank plate 74 is composed of sheet metal having a centrally arranged elongate slot 90 with projecting tabs 92 and 94 at the ends thereof which engage the cylindrical periphery of the eccentric 68 as clearly shown in FIGURE 6. In addition, the crank plate 74 is formed with a pair of elongate slots 96 and 98 generally parallel to slot 90 through which lugs 100 and 102, respectively, integral with the worm gear 60 project. The shaft 62 extends through the slot 90 in the crank plate. The lugs 100 and 102 permit radial sliding movement of the crank plate 74 relative to the worm gear 60, while constraining the crank plate for rotation with the worm gear. As seen particularly in FIGURES 3 through 6, the crank plate 74 has a U-shaped bracket 104 attached thereto adjacent the periphery thereof, and a crank pin 106 is journalled in the upstanding leg portions thereof. The crank pin 106 has its axis disposed in a plane normal to the axis of the stationary shaft 62, and is formed with a diametrically extending cylindrical bore 108.

A drive pin 110 is slidably received in the bore 108, the drive pin 110 being rigidly attached to a yoke 112 having a pin 114 connected between the ends thereof. The pin 114 extends through a diametrical cylindrical opening 116 in the output shaft 28. The output shaft 28 is suitably journalled by bearing means, not shown, in the cover of the gear box 24. The connection between the output shaft 28 and the crank plate 74 constitutes a motion converting mechanism for converting rotation of the crank plate 74 to oscillation of the shaft 28. Thus, upon rotation of the worm gear 60 and the crank plate 74, rotation will be imparted to the crank pin 106 about the axis of the shaft 62, and the crank pin 106 will in turn rotate the drive pin 110 and the yoke 112 thereby imparting oscillation to the shaft 28. The drive pin 110 and the yoke 112 is always maintained in an oblique angular relationship to the axis of the shaft 62, and as long as the radial distance between the axis of the shaft and the axis of the crank pin 106 remains constant, or fixed, the drive pin 110 of the yoke 112 will generate a conical surface during rotation of the crank plate 74. In the disclosed mechanism, with the radius of the crank pin 106 maintained at a distance X as seen in FIGURE 3, the shaft 28 will be oscillated throughout an angle of approximately 110°.

In order to maintain the throw of the crank pin 106 constant at a radius X, the eccentric 68 must be driven with the worm gear 60. To accomplish this result, a drive pawl 118 is attached to a pivot shaft 120 journalled in the worm gear 60. The drive pawl 118 constitutes an interruptible driving connection between the worm gear 60 and the eccentric 68. As seen in FIGURE 7, the pivot shaft 120 is journalled in a boss in the worm gear 60 and has a control lever 122 connected to the opposite end thereof which is biased radially outwardly by a torsion spring 124, the one end of which is secured to the worm gear and the other end 126 of which engages the control lever 122. Thus, the torsion spring 124 urges the inner end of the drive pawl 118 into engagement with the eccentric 68 so that the end 118a of the drive pawl engages the abutments 76 on the eccentric. When the end 118a of the drive pawl 118 engages the abutment 76 on the eccentric during rotation of the worm gear 60, the lug 84 is driven against one end of the torsion spring brake 80 so as to release the same and permit rotation of the eccentric 68 relative to the fixed, or stationary, shaft 62.

With reference to FIGURE 6, the control lever 122 is formed with an axially extending tab 122a. The two position control means for varying the throw of the crank pin 106 includes a pivotally mounted armature 128 which, as shown in FIGURE 8, is supported for pivotal movement by a pin 130 attached to stationary brackets 132 and 134. The armature 128 is engaged by end 136 of a torsion spring 138 encircling the pin 130, the other end 140 of which engages an abutment in the gear box 24 as seen in FIGURES 3, 4 and 5. The torsion spring 138 biases the armature 128 in the clockwise direction about pivot pin 130 as seen in FIGURES 3, 4 and 5 and is capable of moving the armature 128 from the position of FIGURE 3 to the position of FIGURE 4.

The armature 128 is formed with an upstruck tab 142 adjacent one end, and the other end has an opening therethrough which receives the end of a movable switch contact 144, as shown in FIGURES 8 through 11. Thus, the armature constitutes a switch actuator. The armature 128 can be moved in the counterclockwise direction about the pivot pin 130 as viewed in FIGURE 4 to the position of FIGURE 3, upon energization of an electromagnet 146. When the electromagnet 146 is energized, the armature 128 is moved to the position of FIGURES 3 and 9 wherein the movable switch contact 144 engages a stationary contact 147. At this time, the end portion 128a of the armature is not within the orbital path of the tab 122a on the control lever 122. When the electromagnet 146 is deenergized, the torsion spring 138 moves the armature 128 to the position of FIGURES 4, 8 and 10, wherein the movable switch contact 144 engages a stationary switch contact 148. At this time, the end 128a of the armature 128 is positioned in the orbital path of the tab 122a on the control lever 122 such that when the control lever 122 arrives at the position depicted in FIGURE 4, it will be moved in the clockwise direction towards the shaft 62 thereby pivoting the drive pawl 118 in the counterclockwise direction so as to disengage the end 118a from the abutment 76 on the eccentric 68. In this manner the driving connection between the worm gear 60 and the eccentric 68 is interrupted.

During continued rotation of the worm gear 60 and the crank plate 74, from the position of FIGURE 4 to the position of FIGURE 5, the eccentric 68 remains stationary, and accordingly, the crank plate 74 moves radially outward until the crank pin 106 has a maximum crank throw of Y, as viewed in FIGURE 5, after 180° rotation. As the crank plate 74 moves radially outward, the cam periphery 74a thereof engages the tab 142 on the armature 128 and moves the armature to the position shown in FIGURE 11, wherein the movable switch contact 144 does not engage either contact 147 or contact 148. As the throw of the crank pin 106 is increased from the distance X of FIGURE 3 to the distance Y of FIGURE 5, the amplitude of oscillation imparted to the output shaft 28 is increased adjacent one stroke end thereof, and in this manner the oscillation imparted to the wiper blades 52 and 54 is increased adjacent the inboard stroke ends thereof throughout an angle of substantially 15° designated by B in FIGURE 1, so as to move the wiper blades to the depressed park position against the lower reveal molding 12.

With reference to FIGURE 12, the electrical circuits for energizing the motor 22 will be described. The motor 22, as alluded to hereinbefore, is of the unidirectional type and thus includes an armature 150, having a grounded brush 152 and a second brush 154 connected to the ends of a series field winding 156 and a shunt field winding 158. The other end of the series field winding is connected to switch contacts 148 and 147 which, as shown in FIGURES 9 and 11, are disposed within a switch housing 160. The movable contact 144 of the control switch is schematically shown integral with the armature 128 which is biased by torsion spring 138 towards the contact 148. The movable contact 144 is connected by wire 162 to wire 164 which connects with one terminal of a battery 166. The other terminal of the battery is connected to ground. The wire 164 also connects with a coil 168 for energizing the electromagnet 146. The other end of the coil 168 is connected by wire 170 to a stationary switch contact 172 of a manual control switch. The manual control switch includes a second stationary contact 174 connected by wire 176 to the other end of the shunt field winding 128. A speed controlling resistor 178 is connected between the wire 176 and ground. The manual control switch includes a grounded movable contact 180 movable between "off," "low speed" and "high speed" positions.

*Operation*

A complete cycle of operation will be described starting with the manual control switch movable contact 180 in the "off" position. When the manual control switch is in the "off" position, the wiper blades 52 and 54 are in the depressed park position as shown in FIGURE 1, and the mechanism is in substantially the position shown in FIGURE 5. When the movable contact 180 is moved into engagement with contacts 172 and 174, the coil 168 is energized from the battery 166 through wire 164, the coil 168, wire 170, contact 172 and contact 180. When the coil 168 is energized the electromagnet 146 moves the armature 128 from the position of FIGURE 11 to the position of FIGURE 9 wherein contact 144 engages contact 147. When contact 144 engages contact 147, the motor 22 is energized from the battery 166 through wire 164 and wire 152, contacts 144 and 147, the series field winding 156, the brush 154, the armature 150 and the brush 152. At this time the shunt field winding 158 is energized through the series field winding 156, the wire 176 and the contacts 174 and 180 of the manual control switch. Accordingly, the motor 22 is energized for low speed rotation, and the armature 128 is in the position of FIGURE 3. As the worm gear 60 and the eccentric 68 rotate in the counterclockwise direction as viewed in FIGURE 5, the eccentric 68 remains stationary until the end 118a of the drive pawl 118 arrives at the position of FIGURE 4 whereat the torsion spring 124 will engage the end 118a of the drive pawl 118 with the abutment 76 on the eccentric 68. During rotation of the crank plate 74 relative to the eccentric 68 from the position of FIGURE 5 to the position of FIGURE 4, the throw of the crank pin 106 is reduced from the distance Y of FIGURE 5 to the distance X of FIGURES 3 and 4 thereby moving the blades 52 and 54 to the inboard end of their running strokes A.

During continued rotation of the worm gear 60 and the crank plate 74, the torsion spring brake 80 will be released permitting the eccentric 68 to rotate with the worm gear 60 and the crank plate 74 so that the wiper blades 52 and 54 will be driven through their running strokes A as indicated in FIGURE 1.

When the manual control switch 180 is moved to the "high speed" position, energization of the shunt field winding is reduced, since resistor 178 is connected in series therewith. Accordingly, the motor 22 will rotate at a higher speed while the blades 52 and 54 are still oscillated through their running strokes A.

In order to park the wiper blades 52 and 54, the movable switch contact 180 is moved to the "off" position wherein it does not engage either contact 172 or contact 174. Accordingly, the coil 168 is deenergized permitting the torsion spring 138 to pivot the armature 128 from the position of FIGURE 3 to the position of FIGURE 4. When the tab 122a on the control lever 122 arrives at the angular position depicted in FIGURE 4, the end 128a on the armature will trip the control lever 122 thereby disengaging the end 118a of drive pawl 118 from the abutment 76 on the eccentric. Accordingly, during continued rotation of the worm gear 60 and the crank plate 74, the eccentric 68 will remain stationary in the angular position depicted in FIGURE 4. As the crank plate 74 rotates about the eccentric 68, it will move radially outward thereby increasing the throw of the crank pin 106, and when the throw of crank pin 106 is a maximum, as shown in FIGURE 5, the cam surface 74a of the crank plate will engage the tab 142 on the armature so as to move the armature to the position of FIGURE 11 wherein the movable switch contact 144 engages neither contact 147 nor contact 148. At this time, the motor 22 will be deenergized and will coast to a standstill. The extended cam surface 74a on the crank plate 74 is sufficient to allow the motor to coast through several revolutions, since the gear reduction between the worm and worm gear may be on the order of twenty-five to one, and it is apparent that the arcuate extent of the cam surface 74a is in excess of 30°. Since the throw of the crank 106 does not vary appreciably throughout this permissible 30° movement of the crank plate 74, the wiper blades 52 and 54 remain in firm engagement with the lower reveal molding 12.

While the embodiment of the invention as herein disclosed constitutes a preferred form, it is to be understood that other forms might be adopted.

What is claimed is as follows:

1. Windshield wiper actuating mechanism including, a stationary shaft, a rotatable driving member journalled on said shaft, an eccentric journalled on said shaft, brake means between said shaft and said eccentric which, when engaged, preclude rotation of said eccentric relative to said shaft, a driven element journalled on said eccentric and connected to rotate with said driving member although free to move radially relative thereto, an oscillatable driven member, means interconnecting said driving and driven members including a crank carried by said driven element whereby rotation of said driving member will impart oscillation to said driven member, means carried by said driving member and engageable with said eccentric for normally releasing the brake means to permit rotation of said eccentric relative to said shaft and maintain the throw of said crank constant, and means operable to engage said brake means to arrest rotation of said eccentric whereby continued rotation of said driving member and driven element will effect radial movement of said driven element to adjust the throw of said crank and vary the amplitude of oscillation imparted to said driven member.

2. The combination set forth in claim 1 wherein the means for releasing said brake means comprise a drive pawl engageable with said eccentric for imparting rotation thereto.

3. Windshield wiper actuating mechanism including, a stationary shaft, a rotatable driving member journalled on said shaft, an eccentric journalled for rotation on said shaft, a driven element journalled for rotation on said eccentric and connected to rotate with said driving member although capable of radial movement relative thereto, an oscillatable driven member, means interconnecting said driving and driven members including a crank carried by said driven element whereby rotation of the driving member will impart oscillation to said driven member, means carried by said driving member and engageable with said eccentric for imparting rotation thereto whereby the throw of said crank will remain constant, and brake means operable to arrest rotation of said eccentric during continued rotation of said driving member and said driven element to vary the throw of said crank and thereby vary the amplitude of oscillation imparted to said driven member.

4. A variable throw crank assembly including in combination, a stationary shaft, a rotatable driving member journalled on said shaft, an eccentric journalled on said shaft, a driven element rotatably journalled on said eccentric and connected to rotate with said driving member but capable of radial movement relative thereto, a crank carried by said driven element, and brake means operable to arrest rotation of said eccentric during continued rotation of said driving member and said driven element to vary the throw of said crank.

5. A variable throw crank assembly including in combination, a stationary shaft, a rotatable driving member journalled on said shaft, an eccentric journalled on said shaft, a driven element journalled on said eccentric and connected to rotate with said driving member but capable of radial movement relative thereto, a crank carried by said driven element, brake means between said shaft and said eccentric which, when engaged, precludes relative rotation between said eccentric and said shaft, and means operable to engage said brake means and thereby arrest rotation of said eccentric to vary the throw of said crank during continued rotation of said driving member and said driven element.

6. A variable throw crank assembly including in combination, a stationary shaft, a rotatable driving member journalled on said shaft, an eccentric journalled on said shaft, a driven element journalled on said eccentric and connected to rotate with said driving member but capable of radial movement relative thereto, a crank carried by said driven element, means carried by said driving member operable to engage said eccentric to establish an interruptible driving connection therebetween so as to rotate said eccentric with said driving member, and brake means for arresting rotation of said eccentric by interrupting the driving connection between said driving member and said eccentric so as to vary the throw of said crank during continued rotation of said driving member.

7. A variable throw crank assembly including in combination, a stationary shaft, a rotatable driving member journalled on said shaft, an eccentric journalled on said shaft, a brake between said shaft and said eccentric which, when engaged, precludes relative rotation therebetween, a driven element journalled on said eccentric and connected to rotate with said driving member but capable of radial movement relative thereto, a crank carried by said driven element, means carried by said driving member and engageable with said eccentric for releasing said brake to establish a driving connection therebetween whereby said eccentric will be rotated with said driving member, and means operable to arrest rotation of said eccentric by interrupting said driving connection to vary the throw of said crank during continued rotation of said driving member.

8. The variable throw crank assembly set forth in claim 7 wherein said brake comprises a torsion spring having a plurality of helically wound convolutions engaging said shaft, the ends of said torsion spring being engageable with a lug on said eccentric, wherein said eccentric has a peripheral abutment and wherein the means for establishing said interruptible driving connection comprises a pawl carried by said driving member and engageable with the abutment on the eccentric for moving said lug into engagement with one of the ends of said spring to release said clutch.

9. The variable throw crank assembly set forth in claim 8 wherein said pawl is pivotally mounted on said driving member, and resilient means biasing said pawl into engagement with said eccentric.

10. The variable throw crank assembly set forth in claim 9 wherein the pivotal connection for said pawl comprises a pivot pin journalled in said driving member, said pawl being rigidly connected to said pivot pin, and a control lever rigidly connected to said pivot pin and operable to rotate said pivot pin and move said pawl out of engagement with the abutment on said eccentric.

11. Windshield wiper actuating and control mechanism including, an electric motor, variable throw crank means driven by said electric motor, an energizing circuit for said motor including a control switch comprising a pair of spaced stationary contacts and a movable contact disposed therebetween, an actuator connected to said movable contact, two position control means for said variable throw crank means having a connection with said actuator for moving the actuator so that said movable contact engages either one or the other of said stationary contacts, and means engageable with the actuator for moving said movable contact out of engagement with both of said stationary contacts.

12. Windshield wiper actuating and control mechanism including, an electric motor, a variable throw crank driven by said electric motor, an energizing circuit for said motor including a control switch comprising a pair of spaced stationary contacts and a movable contact disposed therebetween, an actuator connected to said movable contact, two position control means for said variable throw crank having a connection with said actuator to move said actuator so that said movable contact engages either one or the other of said stationary contacts, and a cam member driven by said motor and engageable with said actuator for positioning said movable contact whereat it engages neither of said stationary contacts.

13. The actuating and control mechanism set forth in claim 12 wherein said control means includes an electromagnet.

14. The actuating and control mechanism set forth in claim 13 wherein said actuator comprises the armature of said electromagnet.

15. Windshield wiper actuating and control mechanism including, a unidirectional electric motor, an energizing circuit for said motor including a control switch having a pair of spaced contacts and a movable contact disposed therebetween, an electromagnet having an armature connected to said movable contact, resilient means biasing said armature so that said movable contact engages one of said stationary contacts when the electromagnet is deenergized, said electromagnet, when energized, attracting said armature so as to move the movable switch contact into engagement with the other stationary contact, a rotatable driving member connected to said motor, an oscillatable driven member, means interconnecting said driving member and said driven member including a variable throw crank, means operable to maintain the throw of said crank constant when the electromagnet is energized, means operable to vary the throw of said crank during continued rotation of said driving member when said electromagnet is deenergized, and means operable to move said armature to a position wherein the movable contact engages neither of said stationary contacts when the throw of said crank is a maximum to thereby deenergize the motor.

16. The combination set forth in claim 15 including a crank plate connected to rotate with said driving member but capable of radial movement relative thereto, said crank plate carrying said crank.

References Cited in the file of this patent

UNITED STATES PATENTS

| | | |
|---|---|---|
| 2,830,457 | Dyer | Apr. 15, 1958 |
| 2,866,344 | Reese | Dec. 30, 1958 |
| 2,949,035 | Harrison | Aug. 16, 1960 |

FOREIGN PATENTS

| | | |
|---|---|---|
| 878,881 | Germany | July 8, 1949 |
| 873,802 | Germany | Apr. 16, 1953 |